US008626339B2

(12) United States Patent
Fabian

(10) Patent No.: US 8,626,339 B2
(45) Date of Patent: Jan. 7, 2014

(54) DIGITAL MEDIA TRANSACTION KIOSK AND METHOD

(75) Inventor: Kenneth J. Fabian, Grayson, GA (US)

(73) Assignee: NCR Corporation, Duluth, GA (US)

( * ) Notice: Subject to any disclaimer, the term of this patent is extended or adjusted under 35 U.S.C. 154(b) by 274 days.

(21) Appl. No.: 12/914,224

(22) Filed: Oct. 28, 2010

(65) Prior Publication Data

US 2012/0109367 A1     May 3, 2012

(51) Int. Cl.
*G06F 17/00*       (2006.01)

(52) U.S. Cl.
USPC ............................ 700/237; 700/240; 700/241

(58) Field of Classification Search
USPC ......................................... 700/237, 240, 241
See application file for complete search history.

(56) References Cited

U.S. PATENT DOCUMENTS

| 5,725,124 | A  | * | 3/1998  | Bustos et al. ................. 221/211 |
| 7,234,609 | B2 | * | 6/2007  | DeLazzer et al. ............... 221/10 |
| 7,299,109 | B2 | * | 11/2007 | Juds et al. ..................... 700/238 |
| 7,389,919 | B2 | * | 6/2008  | Walker et al. ................. 700/234 |
| 7,412,459 | B1 | * | 8/2008  | Johnson et al. ................. 700/74 |
| 7,422,148 | B2 | * | 9/2008  | Barton et al. ................. 235/383 |
| 7,660,767 | B1 | * | 2/2010  | Schultz et al. ............... 700/235 |
| 7,918,392 | B2 | * | 4/2011  | Beck et al. .................... 235/380 |
| 2003/0040838 | A1 | * | 2/2003 | Lagunzad et al. ............ 700/232 |
| 2004/0254676 | A1 | * | 12/2004 | Blust et al. .................... 700/231 |

* cited by examiner

*Primary Examiner* — Timothy Waggoner
(74) *Attorney, Agent, or Firm* — Paul W. Martin; Peter H. Priest

(57) ABSTRACT

A digital media transaction kiosk and method which provide security for digital media. An example kiosk includes a digital media identifier for reading an identifier of a digital media item on a representative of the digital media item provided by the customer, and a digital media dispenser for dispensing the digital media item to the customer using the identifier.

20 Claims, 5 Drawing Sheets

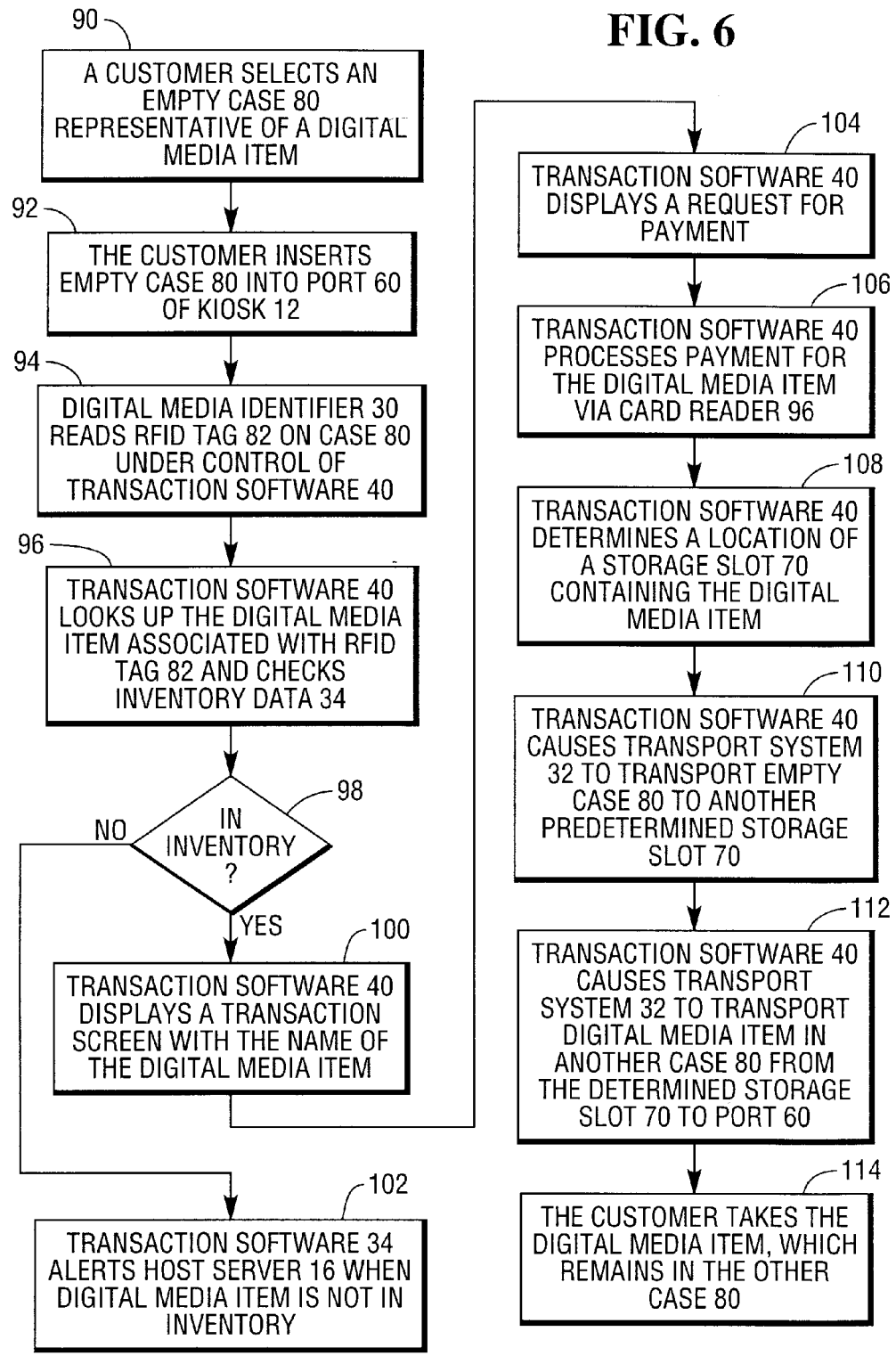

DIGITAL MEDIA TRANSACTION KIOSK AND METHOD

BACKGROUND

The compact disc (CD) and digital video disc (DVD) are leading portable digital data storage formats. Hundreds of millions of discs are produced each year. These discs are used to store digital data files including. but not limited to movies, television shows, music, music videos, video game software, productivity software and a wide array of additional file types and file formats.

These discs are available in pre-recorded, recordable and rewritable formats. Increasingly the consumer is utilizing the recordable and rewritable versions of these media formats to store and/or transport data files, still images, video images, music files, and a wide array of additional file types and file formats.

The CD and DVD disc surfaces are soft and prone to scratching. To protect these discs during transport and to enable uniform stacking and storage of this media, CD and DVD media are stored in cases.

Retailers have difficulty keeping CD and DVD media from being stolen. Security tags and associated systems may not guarantee that CD and DVD media are not removed from a store, lost, or otherwise disposed of.

It would be desirable to provide an alternative digital media transaction method which addresses this issue.

SUMMARY

A digital media transaction kiosk and method are provided.

An example kiosk includes a digital media identifier for reading an identifier of a digital media item on a representative of the digital media item provided by the customer, and a digital media dispenser for dispensing the digital media item to the customer using the identifier.

An example digital media transaction method includes reading an identifier of a digital media item on a representative of the digital media item provided by a customer by a digital media identifier, processing payment for the digital media item from the customer, and dispensing the digital media item to the customer using the identifier by a digital media dispenser.

BRIEF DESCRIPTION OF THE DRAWINGS

FIG. 6 is a flow diagram illustrating an example digital media transaction method.

DETAILED DESCRIPTION

Figure 1:
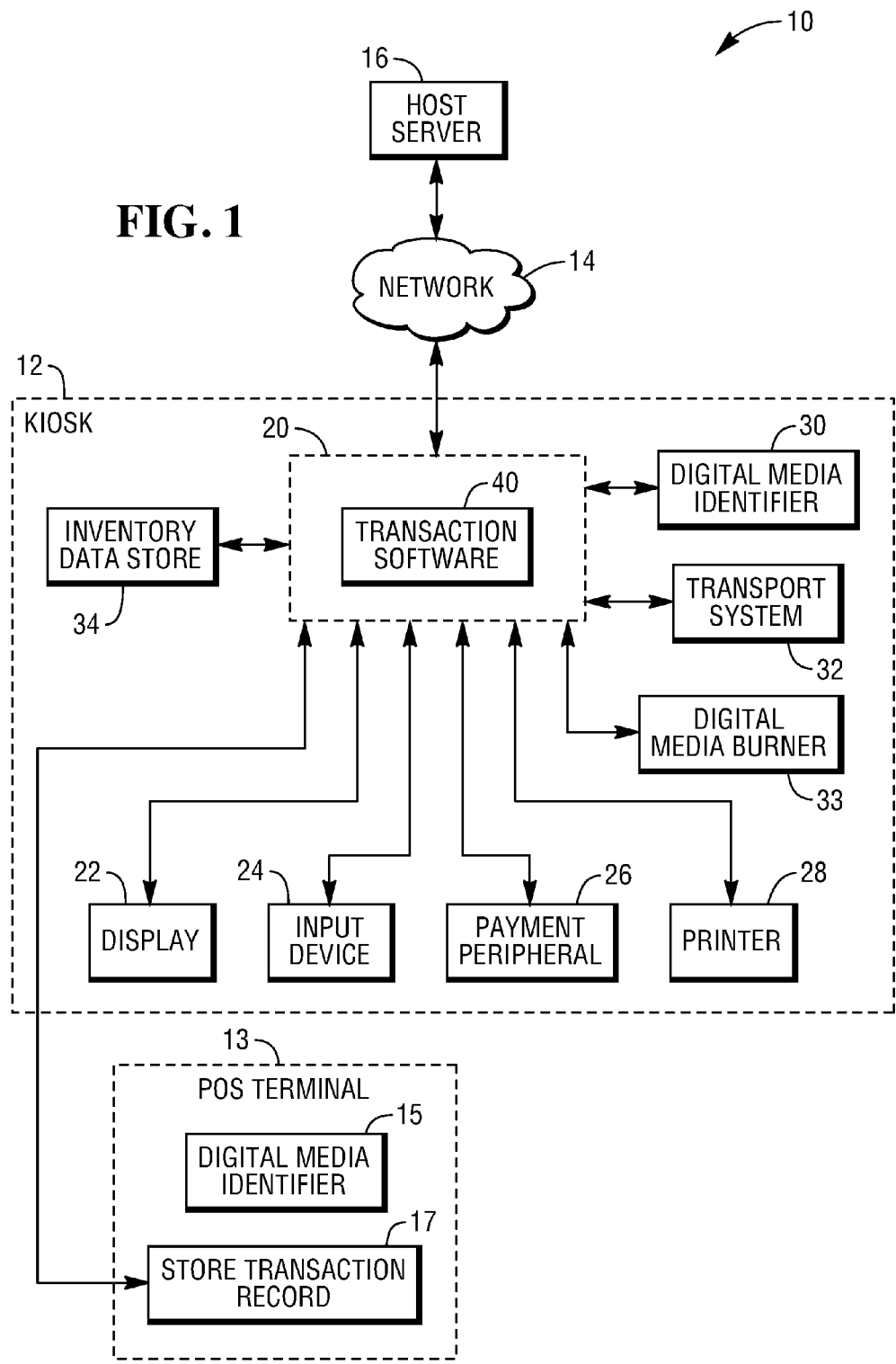
FIG. 1 is a block diagram of an example kiosk.

Referring now to FIG. 1, example digital media transaction system 10 primarily includes kiosk 12.

Kiosk 12 is located in a store with store shelves or other storage systems where empty containers or other representative indicators of digital media are located for selection and transport by customers. Digital media may be available in a physical format as, for example, CDs or DVDs, or available in electronic format for burning downloading to storage devices.

Kiosk 12 may include computer 20, display 22, input device 24, payment peripheral 26, printer 28, 15 digital media identifier 30, transport system 32, digital media burner 33, and inventory data store 34.

Computer 20 includes a processor, memory, program and data storage. Computer 20 may execute an operating system such as a Microsoft operating system, and a web browser for viewing web pages.

Computer 20 controls operation of kiosk 12. Computer 20 executes transaction software 40, which displays images of screens and records operator selections from those screens during a digital media transaction.

A digital media transaction may include a sale of digital media or licenses to digital media. Digital media may include, but not be limited to, movies, television shows, music, music videos, video game software, productivity software and a wide array of additional file types and file formats.

Display 22 displays the images of the transaction screens.

Input device 24 records operator selections during a digital media transaction. Input device 24 may include a touch sensitive device or a keyboard. Input device 24 and display 22 may be combined as a touch screen.

Payment peripheral 26 may include one or more of a card reader for reading credit, debit, and/or loyalty cards; a currency acceptor; a currency dispenser; a coin acceptor; and a coin dispenser.

Printer 28 includes a receipt printer, but may print additional information, such as coupons or other offers or promotions.

Digital media identifier 30 identifies digital media associated with a representative of the digital media provided by a customer from a store shelf or other storage system. A representative of a particular digital media item may include, but not be limited to, an empty case or a card with a barcode or radio frequency identification (RFID) tag or product identifier.

For example, digital media identifier 30 may include an RFID tag reader for reading RFID tags on empty cases or cards.

As another example, digital media identifier 30 may include a barcode reader for reading barcodes on empty cases or cards.

In another example, digital media identifier 30 may read a barcode printed on an RFID tag.

If the representative indicators include numbers or other product identifiers, customers may enter the product identifiers using input device 24.

Transport system 32 delivers digital media from 10 storage locations within inside kiosk 12 to customers following identification of digital media and payment. Transport system 32 may transport physical discs or electronically download digital media in to suitable electronic storage devices, such as customer provided mobile devices.

Transport system 32 may include the capability to put digital media on CDs or DVDs through a "burning" process. This process can be started when a purchase is authorized at a checkout counter. A few minutes later, the digital media are available at the kiosk.

If the representative indicators are empty cases, transport system 32 may accept the empty cases and store them inside kiosk 12. The case could also be used to authorize a digital download where no physical media was taken from the store.

Digital media identifier 30 may be located along the transport path, facilitating identification. Digital media identifier 30 may also be used to identify dispensed digital media.

Inventor data store 34 contains an inventory of digital media within kiosk 12, either physical discs or digital media files or both. Transaction software 40 updates the inventory of digital media each time a digital media item is dispensed or received. Transaction software 40 may also send updated inventory information to host server 16 via network 14. Host server 16 may manage inventory in a plurality of kiosks 12.

Network 14 may include a cellular communication network, a global communications network also known as the Internet, a wired or wireless network, or any combination of such networks.

Figure 2:
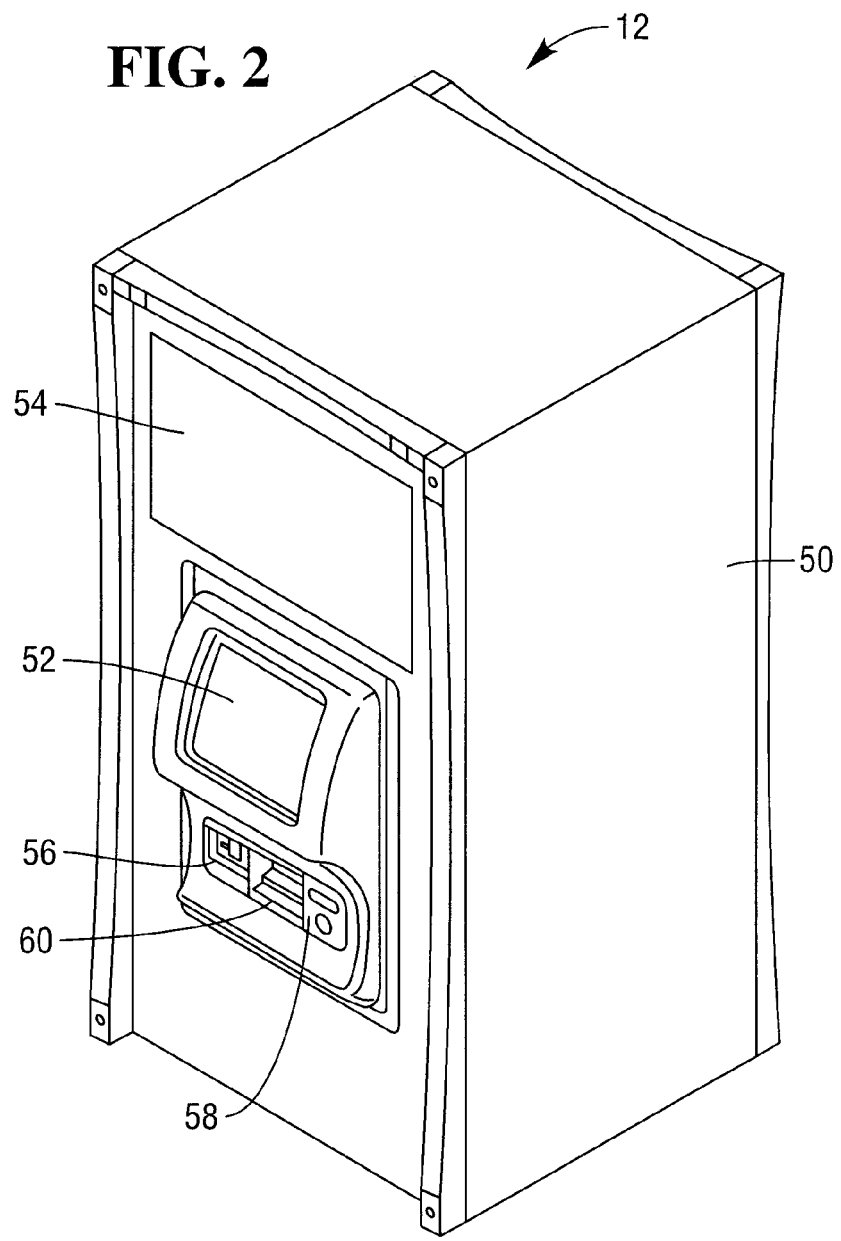
FIG. 2 is a view illustrating the example kiosk.

Referring to FIG. 2, an example kiosk 12 is illustrated. Example kiosk 12 may be based upon the entertainment kiosk disclosed in commonly-assigned published U.S. application Ser. No. 10/866,387, publication number 2004/0254676, entitled "AUTOMATED BUSINESS SYSTEM AND METHOD OF VENDING AND RETURNING A CONSUMER PRODUCT". This published application is hereby incorporated by reference.

Example kiosk 12 includes housing 50 for storing digital media in cases. Kiosk 12 further includes touch screen 52, auxiliary display 54, card reader 56, printer 58, and dispense and retrieve port 60.

Auxiliary display 54 displays movie trailers, promotions, and other information under the control of transaction software 40.

Dispense and retrieve port 60 includes a slot from which digital media in cases are dispensed and into which empty cases may be inserted. Digital media identifier 30 may be located in dispense and retrieve port 60 or on transport system 32.

Figure 3:
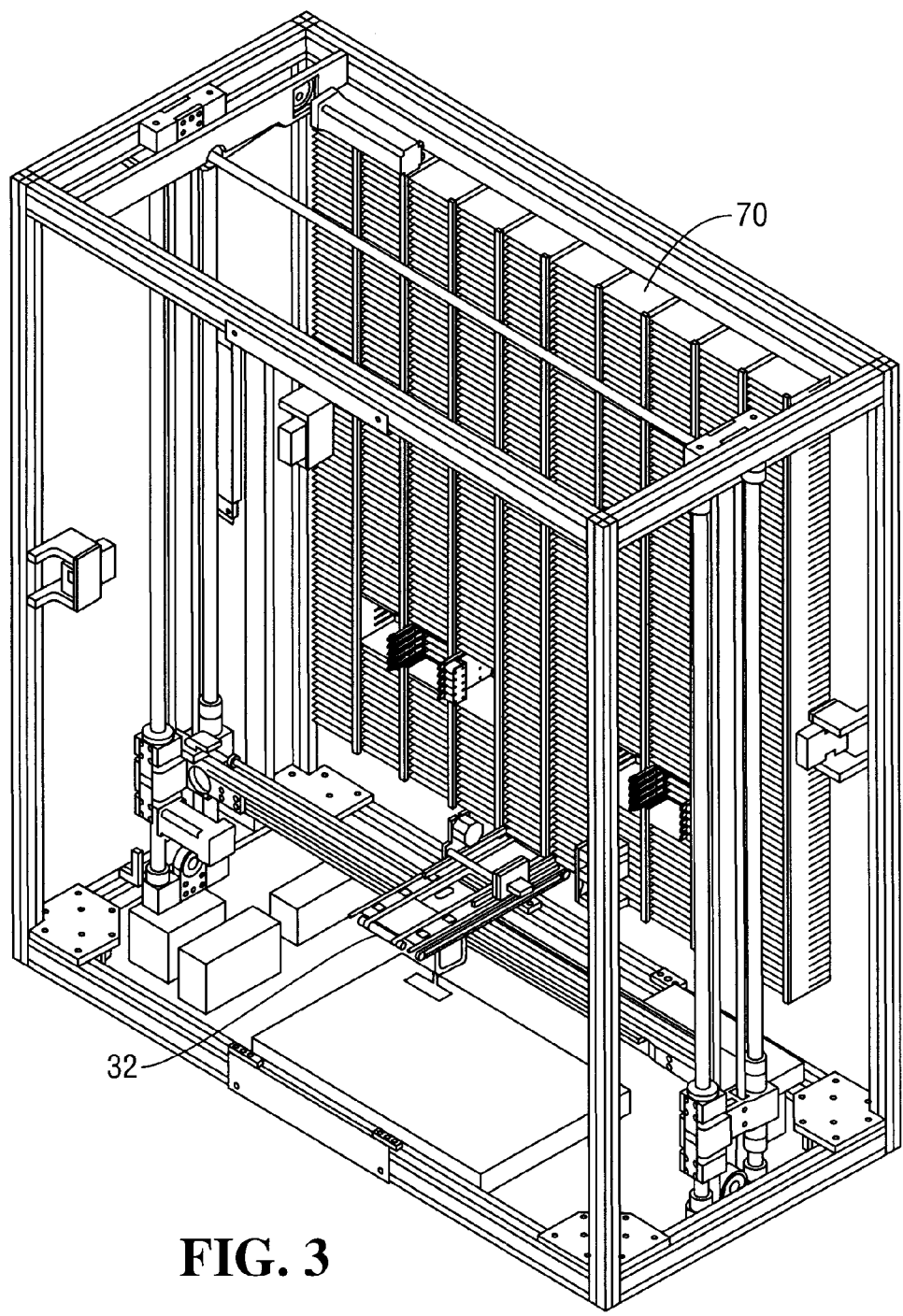
FIG. 3 is a view inside the example kiosk illustrating an example configuration of storage bins.

With reference to FIG. 3, transport system 32 may include a system as described in the incorporated published application, capable of movement along three different dimensions, vertical, horizontal and forwards/backwards. Transport system 32 interacts with port 60 to transport digital media as CDs or DVDs in cases from storage slots 70 to port 60 and to transport empty cases from port 60 to slots 70.

Figure 4:
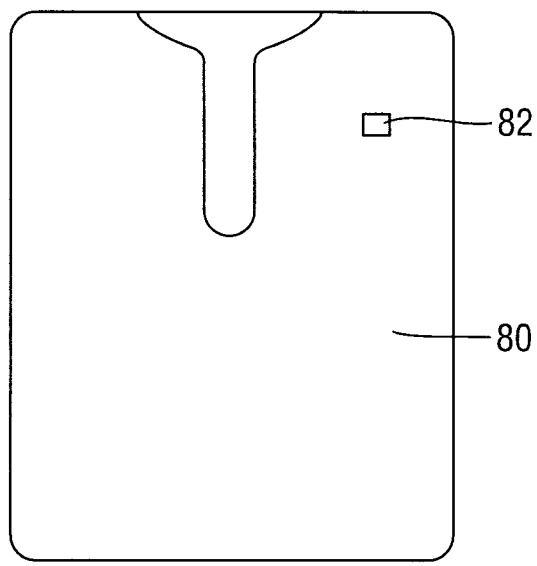
FIG. 4 is a view illustrating an example digital media case without media.
Figure 5:
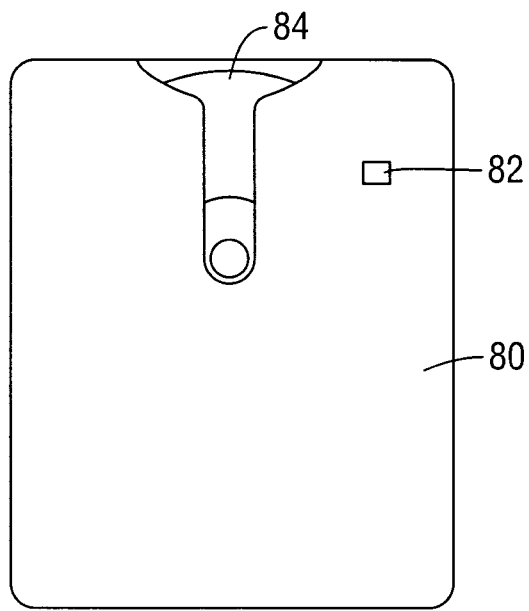
FIG. 5 is a view illustrating an example digital media case with media.

With reference to FIGS. 4-5, an example case 80 contains a digital media item stored within a DVD or CD. Case 80 includes an RFID tag 82.

FIG. 4 illustrates an example empty case 80, while FIG. 5 illustrates example case 80 with an inserted CD or DVD containing digital media item 84. The inserted CD or DVD may have its own RFID tag to facilitate identification of the digital media item itself.

In other embodiments, empty and filled cases do not need to be the same. For example, empty cases do not need to have the same dimensions as filled cases. Empty cases for use on shelves could be thinner than filled cases to allow more empty cases to be displayed on the shelves.

Example case 80 may additionally include a security tag which is read by a security system and which causes an alarm to be sounded when the customer leaves the store with an empty case rather than a full case.

Referring now to FIG. 6, an example digital media transaction method begins with a customer selecting an empty case 80 representative of a digital media item in step 90.

In step 92, the customer inserts empty case 80 into port 60 of kiosk 12.

In step 94, digital media identifier 30 reads RFID tag 82 on case 80 under control of transaction software 40.

In step 96, transaction software 40 looks up the digital media item associated with RFID tag 82.

In step 98, transaction software 40 checks inventory data 34 to determine whether the digital media item is in inventory within kiosk 12. If not, operation proceeds to step 100. Otherwise, operation proceeds to step 102.

In step 100, transaction software 34 alerts host server 16 when digital media item is not in inventory so that additional inventory may be placed within kiosk 12. For this purpose, host server 16 may be an in-store server or an external server that manages inventory in a plurality of kiosks 12.

There may be multiple kiosks in the store or within a reasonable distance of each other. When there is no inventory in the kiosk, transaction software 34 may receive another location (other kiosk in the store, at a service desk, or some other location) of the digital media item from host server 16 and display the other location to the customer.

In step 102, transaction software 40 displays a transaction screen with the name of the digital media item.

In step 104, transaction software 40 displays a request for payment.

As an alternative approach, a customer can pay for the digital media item during checkout of other items, and then take the empty case to kiosk 12. At checkout, a point-of-sale (POS) terminal 13 uses a digital media identifier 15 to read RFID tag 82 and mark the corresponding digital media item as "paid" in a store transaction record 17. Transaction software 40 reads the store record before step 104, and skips step 104 after finding that the digital media item has been paid for.

In the event that an empty case 80 is presented to a cashier and a corresponding digital media item is not in inventory in kiosk 12, the cashier may enter customer mailing information into the POS terminal and mail the digital media item to the customer. The store could also authorize a digital download of the digital media item with physical media mailed to the customer.

In step 106, transaction software 40 processes payment for the digital media item via card reader 56.

In step 108, transaction software 40 determines a location of a storage slot 70 containing the digital media item.

In step 110, transaction software 40 causes transport system 32 to transport empty case 80 to another predetermined storage slot 70.

In step 112, transaction software 40 causes transport system 32 to transport digital media item in another case 80 from the determined storage slot 70 to port 60.

In step 114, the customer takes the digital media item, which remains in the other case 80.

Kiosk 12 may be used to satisfy security in this way, but may also be used for renting or selling digital media directly to customers. Customers may browse through available titles and complete a transaction without first obtaining an empty case 80.

In an alternative or additional example transaction method, an empty case 80 may serve as a "gift" case, presented to someone as a gift. RFID tag 82 identifies the gift case as exchangeable for any digital media item within its gift class in a store.

Although particular reference has been made to certain embodiments, variations and modifications are also envisioned within the spirit and scope of the following claims.

The invention claimed is:

1. A digital media transaction method utilizing a kiosk for sale of digital media items comprising:
   reading an identifier of a digital media item on a representative of the digital media item to identify the digital media item for the representative of the digital media item selected from a store display by a customer, and provided by the customer to a digital media identifier at the kiosk;

processing payment for the digital media item, the entirety of the payment received from the customer separately from the representative of the digital media item; and dispensing the digital media item to the customer at a dispense port of the kiosk employing a transport system.

2. The method of claim 1, wherein the representative of the digital media item comprises an empty case and the digital media comprises a digital media disc in a case.

3. The method of claim 2 further comprising:
dispensing digital media items in a format other than a digital media disc.

4. The method of claim 3, wherein dispensing digital media items in a format other than a digital media disc comprises:
electronically downloading a digital media item by the kiosk to a customer provided mobile device.

5. The method of claim 1, wherein the representative of the digital media item comprises a card.

6. The method of claim 1, wherein the identifier comprises a barcode and the digital media identifier comprises a barcode reader.

7. The method of claim 1, wherein the identifier comprises a radio frequency identification tag and the digital media identifier comprises a radio frequency identification tag reader arranged along a transport path from storage for digital media items in cases and the dispense port.

8. The method of claim 1, wherein the digital media identifier is located at a checkout stand.

9. The method of claim 8, wherein the payment is processed by a transaction computer at the checkout stand and burning on the digital media starts when a purchase is authorized at the checkout stand.

10. The method of claim 1, wherein the digital media identifier is located at the dispense port.

11. The method of claim 10, wherein the payment is processed by at the kiosk utilizing a payment peripheral.

12. The method of claim 1, wherein the dispensing step comprises dispensing a disc in a case from an inventory containing the digital media item to the customer by the digital media dispenser and the digital media identifier is also used to identify the digital media item dispensed to the customer.

13. The method of claim 12, wherein the dispensing step further comprises burning the digital media item to the disc.

14. The method of claim 1, wherein the dispensing step comprises downloading the digital media item to a customer device.

15. The method of claim 1 further comprising:
identifying the dispensed digital disc utilizing a digital media identifier located along a transport path from a storage location within the kiosk to a dispensing port to a customer.

16. The method of claim 1 wherein dispensing the digital media disc to the customer comprises:
utilizing the transport system to deliver the digital media disc from a storage location inside the kiosk to the customer.

17. The method of claim 1 wherein the identifier is an RFID tag and the method further comprises:
looking up the digital media item associated with the RFID tag employing transaction software.

18. The method of claim 17 further comprising:
checking inventory data to determine whether the digital media item is in inventory within the kiosk.

19. A digital media transaction kiosk comprising:
a digital media identifier for reading an identifier of a digital media item on a representative of the digital media item selected by a customer from a store display;
a payment processor for processing payment for the digital media item, the entirety of the payment received from the customer separately from the representative of the digital media item; and
a digital media dispenser for dispensing the digital media item to the customer using the identifier.

20. A digital media transaction method utilizing a kiosk for sale of digital media items in cases comprising:
reading an identifier of a digital media item on a representative of the digital media item to identify the digital media item for the representative of the digital media item selected from a store display by a customer, and provided by the customer to a digital media identifier at the kiosk;
processing a ent for the digital media item, the entirety of the payment received from the customer separately from the representative of the digital media item; and
dispensing the digital media item to the customer at a dispense port of the kiosk employing a transport system, wherein the representative of the digital media item comprises an empty case and further comprising:
reading the identifier of the digital media disc on the representative of the digital media item utilizing the digital media identifier; and
transporting the empty case to store the empty case inside the kiosk utilizing a transport system.

* * * * *